(12) United States Patent
Sugawara et al.

(10) Patent No.: US 6,464,362 B1
(45) Date of Patent: Oct. 15, 2002

(54) ILLUMINATING APPARATUS

(75) Inventors: Saburo Sugawara, Kawasaki; Atsushi Okuyama, Tokorozawa, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/427,434

(22) Filed: Oct. 26, 1999

(30) Foreign Application Priority Data

Oct. 29, 1998 (JP) .......................................... 10-322963

(51) Int. Cl.⁷ ................................................ G03B 21/14
(52) U.S. Cl. ........................................ 353/102; 353/38
(58) Field of Search ............................ 353/102, 98, 38; 362/299, 300, 326, 335

(56) References Cited

U.S. PATENT DOCUMENTS 2,748,659 A    6/1956   Geffcken et al.
3,296,923 A  * 1/1967   Miles ........................... 353/102
3,702,395 A  * 11/1972  Rosendahl ..................... 353/102
5,098,184 A  * 3/1992   Van Den Brandt et al. ..... 353/38
5,833,341 A  * 5/2000   Kimura et al. .................. 353/98
6,062,695 A  * 5/2000   Kakuda et al. ................. 353/38
6,089,720 A  * 7/2000   Sawai .............................. 353/98

* cited by examiner

*Primary Examiner*—William Dowling
(74) *Attorney, Agent, or Firm*—Morgan & Finnegan, LLP

(57) ABSTRACT

For increasing the illumination efficiency to a liquid-crystal display element, an illuminating apparatus has a reflector for reflecting light from a light source, a negative meniscus lens, which is convex on the light source side, a first lens array unit of lens elements, a second lens array unit of lens elements, which is conjugate with the light source, and an optical polarization converting element in the stated order along a traveling direction of the light from the light source. The illuminating apparatus illuminates the liquid-crystal display element through the optical polarization converting element.

52 Claims, 10 Drawing Sheets

ACTUAL COMBINED FOCAL LENGTH OF OPTICAL PATH a fa=52.88 *140/152.61 =48.51mm
ACTUAL COMBINED FOCAL LENGTH OF OPTICAL PATH b fb=11.62 *140/198.21 =8.207mm

ACTUAL COMBINED FOCAL LENGTH OF OPTICAL PATH aa faa=52.88 *125.57/152.61=43.51mm
ACTUAL COMBINED FOCAL LENGTH OF OPTICAL PATH bb fbb=11.62 *139.58/198.21=8.183mm

ILLUMINATING APPARATUS

BACKGROUND OF THE INVENTION

1. Field of the Invention

The present invention relates to an illuminating apparatus used in liquid-crystal projectors etc., and a projection type display apparatus using it.

2. Related Background Art

The conventional illuminating devices for projection type display apparatus were usually constructed of a combination of arc tube 1 with parabolic mirror 19 as illustrated in FIG. 10.

In FIG. 10, white light emitted from a light-emitting portion 1c of the arc tube 1 (light source) is converted into nearly parallel light by the parabolic mirror 19 and a first lens array 3 forms a light source image of the arc tube 1 at the center of each lens of second lens array 4. The first lens array 3 and the second lens array 4 have their respective focal lengths approximately equal to each other, and the first lens array 3 and the second lens array 4 are spaced from each other so that the spacing between them is approximately equal to the focal length of the first lens array 3.

The light condensed by the first lens array 3 is separated into p-polarized light and s-polarized light by a polarization separating layer 5B of a polarization converting element 5. The s-polarized light is reflected and is further reflected by an adjacent polarization separating layer 5B, whereby the light emerges from between half wave plates 5A arranged in a reed screen pattern on the exit side of the polarization converting element 5. On the other hand, the p-polarized light passes through the polarization separating layer 5B and then through the half wave plate 5A to undergo phase conversion, whereby the direction of the polarization axis thereof is aligned with that of the s-polarized light. Therefore, all the beams emitted from the polarization converting element 5 are the polarized light having the axis of polarization along the same direction. Reference symbol 5C designates shield plates arranged in a reed screen pattern.

The light emerging from the polarization converting element 5 is condensed by first condenser lens 6 to be deflected onto display regions 8R, 8G, 8B of respective image modulating devices, each device being comprised of a liquid-crystal panel, where the light is modulated in each color of R, G, or B. Among the light emerging from the first condenser lens 6, red light is reflected by a dichroic mirror DM1 and the rest green light and blue light is transmitted thereby. The red light reflected by the dichroic mirror DM1 is guided via reflecting mirror M1 and second condenser lens 7R to the display region 8R of the image modulating device for red. The light transmitted by the dichroic mirror DM1 is separated into green and blue beams by the dichroic mirror DM2. The green light is reflected by the dichroic mirror DM2 to be guided through the second condenser lens 7G to the display region 8G of the image modulating device for green. The blue light transmitted by the dichroic mirror DM2 is condensed by third condenser lens 11 and reflected by reflecting mirror M2 to be guided through relay lens 12 and via reflecting mirror M3 and second condenser lens 7B to the display region 8B of the image modulating device for blue. In the drawing, P1 denotes polarizing plates on the entrance side and P2 polarizing plates on the exit side. The second condenser lenses 7R, 7G, 7B are placed for condensing the beam emerging from the first condenser lens 6 onto the entrance pupil of projection lens 10. For color composition, a cross dichroic prism 9 is positioned between the display regions 8R, 8G, 8B of the image modulating devices and the projection lens 10. The projection lens 10 is designed so as to be telecentric with respect to the display regions 8R, 8G, 8B of the image modulating devices, and angles of incidence at dichroic film surfaces of the cross dichroic prism 9 are arranged so as to be constant everywhere on the dichroic films, thereby preventing chromatic unevenness from occurring due to difference in the angles of incidence on the dichroic films. Beams modulated by the respective display regions 8R, 8G, 8B of the image modulating devices undergo color composition in the cross dichroic prism 9 and combined light is projected at an enlargement ratio onto an unrepresented screen by the projection lens 10.

In order to further improve the illumination efficiency, the liquid-crystal projector suggested in Japanese Patent Application Laid-Open No. 10-133141 is constructed using a light source device of a combination of an ellipsoidal mirror with a pair of lens arrays, the lens array on the light source side having the concave lens effect. An embodiment disclosed in FIG. 1 of the official gazette of this Japanese Patent Application Laid-Open No. 10-133141 has a light source section composed of a light source, an ellipsoidal mirror, a first lens array having a concave surface with the concave lens effect on the entrance side, and a second lens array, thereby realizing the smaller size of the lens arrays than those before it.

Incidentally, in the ordinary liquid-crystal projectors as illustrated in FIG. 10, it is important in order to improve the illumination efficiency that the eclipse at the shield plates 5C of the polarization converting element 5 be reduced by improving the parallelism of the beams incident to the first lens array 3 and that the eclipse at the entrance pupil of the projection lens 10 be reduced by decreasing the diameter of the whole light emerging from the polarization converting element 5.

When the parabolic mirror is used in the light source section, the focal length of the parabolic mirror, however, has to be increased in order to improve the parallelism of the beams emerging from the parabolic mirror. As a result, when a take-in angle of the light emitted from the light source is fixed at the reflector, the exit diameter of the parabolic mirror becomes larger at an increase ratio of the focal length of the parabolic mirror. Conversely, the focal length of the parabolic mirror has to be decreased in order to decrease the exit diameter of the parabolic mirror. The decrease of the focal length will degrade the parallelism of the beams emerging from the parabolic mirror when it is considered that the light source has the finite size.

As described above, the parallelism of the light emerging from the light source section, and the exit diameter are in the relation of tradeoff. With use of the parabolic mirror in the light source section, it was thus impossible to realize the light source section with good parallelism and small exit diameter while assuring a sufficient take-in angle of the light emitted from the light source.

For these reasons, the conventional example described in the aforementioned official gazette employed the ellipsoidal mirror and the concave lens (negative lens) in the light source section in order to improve the illumination efficiency, but optimization of the shape of the concave lens was not enough, though the size reduction of the lens arrays was realized to some extent; therefore, it had the problem that the illumination efficiency was not increased so much.

SUMMARY OF THE INVENTION

The present invention has been accomplished in view of the problems in the above conventional examples, and an object of the present invention is to realize the size reduction of the lens arrays and the increase of the illumination efficiency.

In order to accomplish the above object, an illuminating apparatus according to a first aspect of the present invention is one comprising a light source, a reflector for collecting light emitted from the light source, a negative meniscus lens which is convex on the light source side, a first optical element comprised of a lens array comprising a plurality of lenses, and a second optical element comprised of a lens array comprising a plurality of lenses, wherein the negative meniscus lens is laid between the light source and the first optical element.

In order to accomplish the above object, an illuminating apparatus according to a second aspect of the present invention is one arranged to collect light from a light source, direct the light toward a lens array system, and effect illumination with the light from this lens array system, wherein a negative meniscus lens which is convex on the light source side is provided in an optical path of the collected light. The lens array system is, for example, one comprising at least one fly's eye lens or lenticular lens.

Here the negative meniscus lens means a meniscus lens having a negative refracting power (concave lens action).

In a preferred embodiment of the present invention, the reflector is an ellipsoidal surface of revolution and satisfies the following condition:

$$0.03 < f1/f2 < 0.07 \qquad (1)$$

(where f1 is the first focal length of the ellipsoidal reflector and f2 the second focal length of the ellipsoidal reflector).

Condition (1) defines a ratio of the first focal length f1 to the second focal length f2 of the ellipsoidal reflector preferably used in the present invention. In the region below the lower limit of Condition (1), the second focal length f2 is too long, so that the size of the light source section becomes large. In the region above the upper limit of Condition (1), the focal length f2 is too short, so that the negative lens can interfere with the ellipsoidal reflector. Therefore, the regions off the above range are not preferable.

The negative lens is a negative meniscus lens and satisfies the following conditions:

$$0.5 < -ff/f2 < 0.8 \qquad (2)$$

$$0.5 < L/f2 < 0.8 \qquad (3)$$

(where ff is the focal length of the negative meniscus lens and L is the spacing between the negative meniscus lens and the second focal point of the ellipsoidal reflector).

Condition (2) defines a ratio of the focal length ff of the negative meniscus lens preferably used in the present invention to the second focal length f2 of the ellipsoidal mirror. In the region below the lower limit of Condition (2), the exit diameter of beams from the light source section becomes small, but the parallelism of beams is too poor, so as to decrease the illumination efficiency. In the region over the upper limit of Condition (2), the exit diameter of beams from the light source section is too large, so that a great eclipse occurs at the entrance pupil of the projection lens, thereby decreasing the illumination efficiency.

Condition (3) defines a ratio of the spacing L between the negative meniscus lens preferably used in the present invention and the second focal point of the ellipsoidal reflector to the second focal length f2 of the ellipsoidal reflector. In the region below the lower limit of Condition (3), the exit diameter of beams from the light source section becomes small, while the parallelism of beams becomes too poor, so as to decrease the illumination efficiency. In the region over the upper limit of Condition (3), the exit diameter of beams from the light source section becomes too large and a large eclipse appears at the entrance pupil of the projection lens, thus decreasing the illumination efficiency.

Basically, the beams emerging from the negative meniscus lens become parallel, if the negative meniscus lens is positioned a distance approximately equal to the focal length of the negative meniscus lens apart from the second focal point of the ellipsoidal reflector.

This negative meniscus lens is preferably one further satisfying the following condition:

$$-4 < SF < -1.5 \qquad (4),$$

provided that $SF=(R2+R1)/(R2-R1)$ (where R1 is a radius of light-source-side curvature of the negative meniscus lens and R2 a radius of image-display-side curvature of the negative meniscus lens).

Condition (4) defines the shape of the negative meniscus lens preferably used in the present invention. In the region below the lower limit of Condition (4), the radius of curvature of the lens surface on the first lens array side becomes too small, so that a loss of light amount can be caused by total reflection in the periphery of the lens. In the region over the upper limit of Condition (4), the curvature of the refractively acting surface of the negative meniscus lens is small on the first lens array side, so as to increase the exit diameter of the beams emerging from the light source section, so that the eclipse becomes large at the projection lens, thereby decreasing the illumination efficiency.

Further, the negative meniscus lens preferably comprises at least one aspherical surface.

DETAILED DESCRIPTION OF THE PREFERRED EMBODIMENTS

Embodiments of the present invention will be described below by reference to the drawings.

(First Embodiment)

Figure 1:
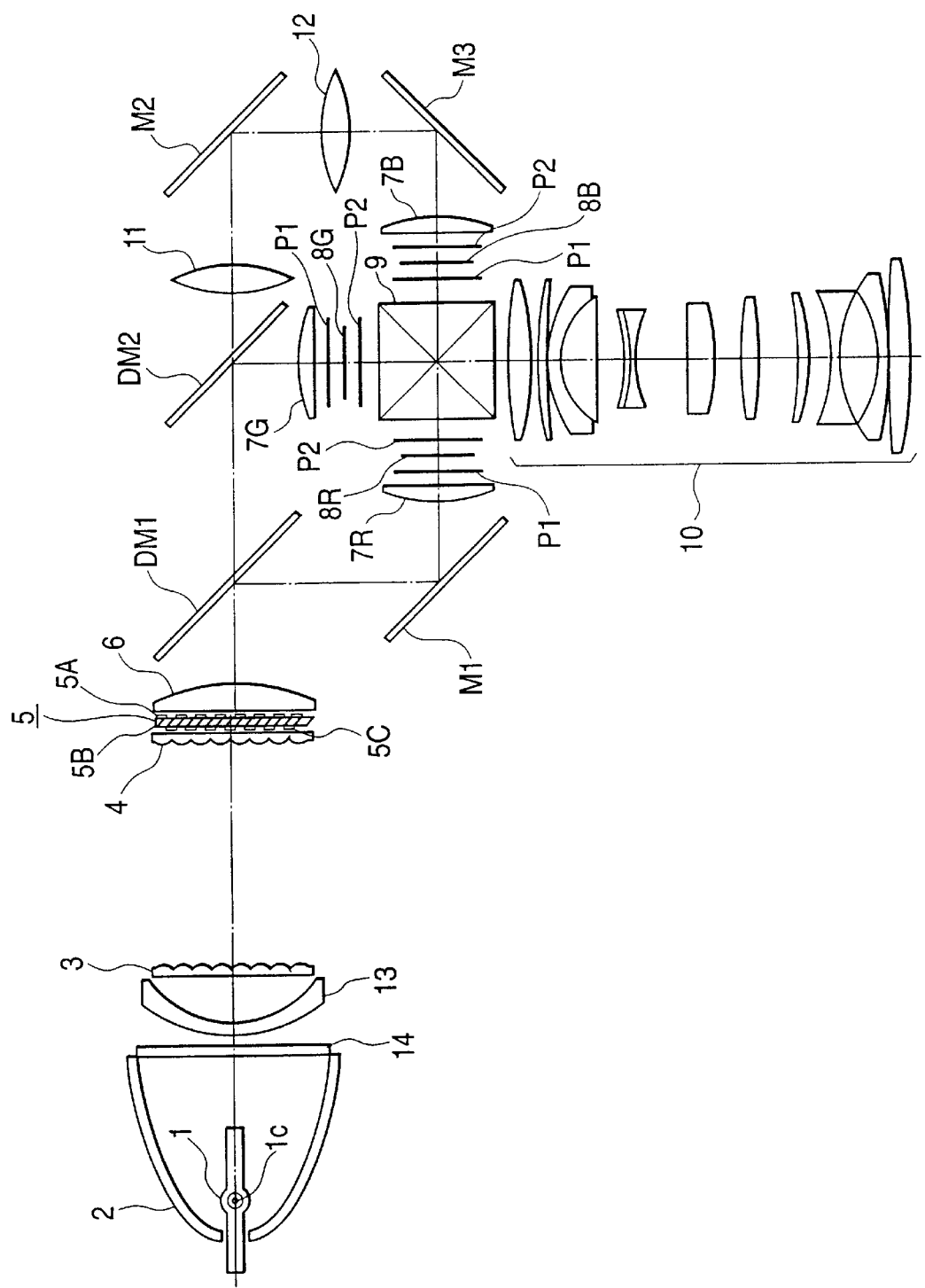
FIG. 1 is an optical, cross-sectional view of a projection type display device according to the first embodiment of the present invention.

FIG. 1 is an optical, cross-sectional view of a projection type display device according to the first embodiment of the present invention. It is assumed in the following description that the size of the light-emitting portion of the light source (arc tube) is approximately 1.5 mm.

The white light emitted from the light-emitting portion 1c of the arc tube 1 (light source) is collected toward the second focal point, not illustrated, by the ellipsoidal reflector 2 and then passes through a plane-parallel plate 14. Then the light is converted into nearly parallel light by the negative meniscus lens 13 which is convex on the light source side. This light is incident to the first lens array 3, whereby a light source image of the arc tube 1 is formed at a center of each lens of the second lens array 4. The plane-parallel plate 14 is positioned on the front surface of the reflector 2 in order to assure the safety in the event of explosion of the arc tube. The first lens array 3 and the second lens array 4 have their respective focal lengths nearly equal to each other, and the first lens array 3 and the second lens array 4 are spaced from each other so that the spacing between them is approximately equal to the focal length of the first lens array 3. The light condensed by the first lens array 3 is separated into p-polarized light and s-polarized light by the polarization separating layer 5B of the polarization converting element 5. The p-polarized light is transmitted by the polarization separating layer 5B, while the s-polarized light is reflected thereby. The p-polarized light undergoes phase conversion in the half wave plate 5A, so that the direction of the axis of polarization thereof is aligned with that of the s-polarized light. Based on this, all the beams emerging from the polarization converting element 5 become the polarized light having the axis of polarization along the same direction. Reference symbol 5C denotes the shield plates arranged in the reed screen pattern.

Further, the light emerging from the polarization converting element 5 is condensed by the first condenser lens 6 to be deflected onto the display regions 8R, 8G, 8B of respective image modulating devices, each device being comprised of a liquid-crystal panel, where the light is modulated in each color of R, G, or B. Among the light emerging from the first condenser lens 6, the red light is reflected by the dichroic mirror DM1 and the rest green light and blue light is transmitted thereby. The red light reflected by the dichroic mirror DM1 is guided via the reflecting mirror M1 and second condenser lens 7R to the display region 8R of the image modulating device for red. The light transmitted by the dichroic mirror DM1 is separated into green and blue beams by the dichroic mirror DM2. The green light is reflected by the dichroic mirror DM2 to be guided through the second condenser lens 7G to the display region 8G of the image modulating device for green.

The blue light transmitted by the dichroic mirror DM2 is condensed by the third condenser lens 11 and reflected by the reflecting mirror M2 to be guided through the relay lens 12 and via the reflecting mirror M3 and second condenser lens 7B to the display region 8B of the image modulating device for blue. In the drawing, P1 denotes the polarizing plates on the entrance side and P2 the polarizing plates on the exit side. The second condenser lenses 7R, 7G, 7B are placed for condensing the beam emerging from the first condenser lens 6 onto the entrance pupil of projection lens 10. For color composition, the cross dichroic prism 9 is positioned between the display regions 8R, 8G, 8B of the image modulating devices and the projection lens 10. The projection lens 10 is designed so as to be telecentric with respect to the display regions 8R, 8G, 8B of the image modulating devices, and angles of incidence at dichroic film surfaces of the cross dichroic prism 9 are arranged so as to be constant everywhere on the dichroic films, thereby preventing chromatic unevenness from occurring due to difference in the angles of incidence on the dichroic films. The beams modulated by the respective display regions 8R, 8G, 8B of the image modulating devices undergo color composition in the cross dichroic prism 9 and the thus combined light is projected at an enlargement ratio onto the unrepresented screen by the projection lens 10.

In the embodiment of FIG. 1 the improvement in the illumination efficiency is realized by the combination of the ellipsoidal mirror with the negative meniscus lens convex on the light source side in the light source section.

Next described referring to FIGS. 2 to 5 is how the illuminating apparatus of the present embodiment is improved in terms of the principles as compared with the conventional illuminating apparatus.

Figure 2:
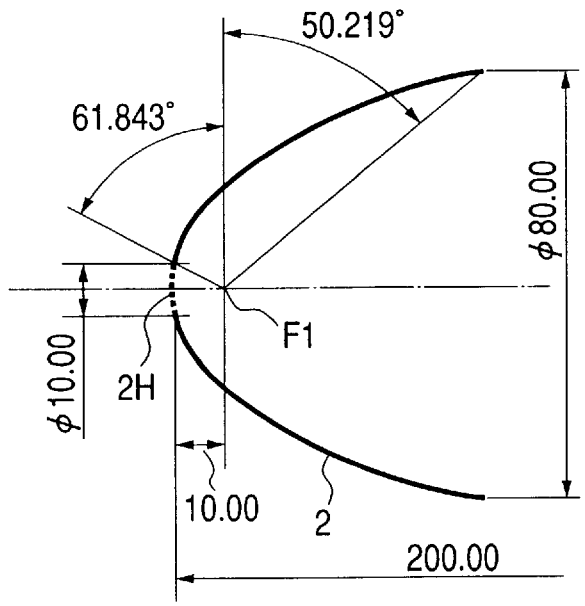
FIG. 2 is an optical, cross-sectional view of an ellipsoidal mirror used in the embodiment of the present invention.
Figure 3:
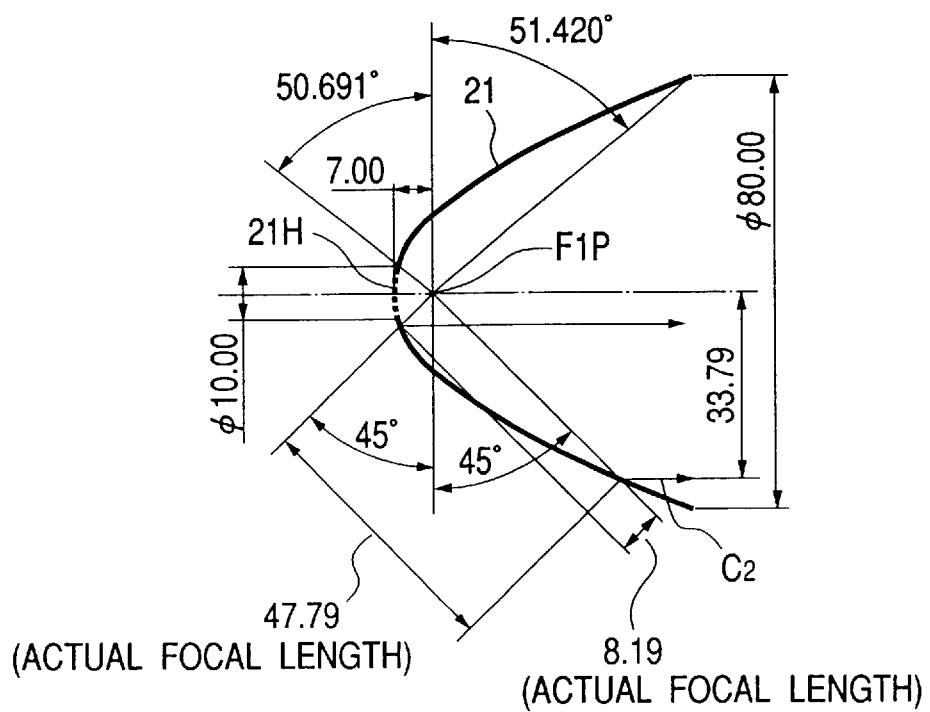
FIG. 3 is a cross-sectional view of a parabolic mirror of a conventional example.

First described referring to FIG. 2 and FIG. 3 is the reason why the ellipsoidal reflector has the higher illumination efficiency than the parabolic mirror.

FIG. 2 shows the reflector used in the present embodiment and is a cross-sectional view of the ellipsoidal reflector in which the distance from the first focal point to an intersecting point between the reflecting surface of the ellipsoid and the optical axis is 10 mm, the distance from the second focal point to the intersecting point between the reflecting surface of the ellipsoid and the optical axis is 200 mm, the diameter of a hole of the reflector is 10 mm, and the effective diameter of the reflector is 80 mm, which also includes a take-in angle of light from the first focal point F1 by the reflector.

Figure 10:
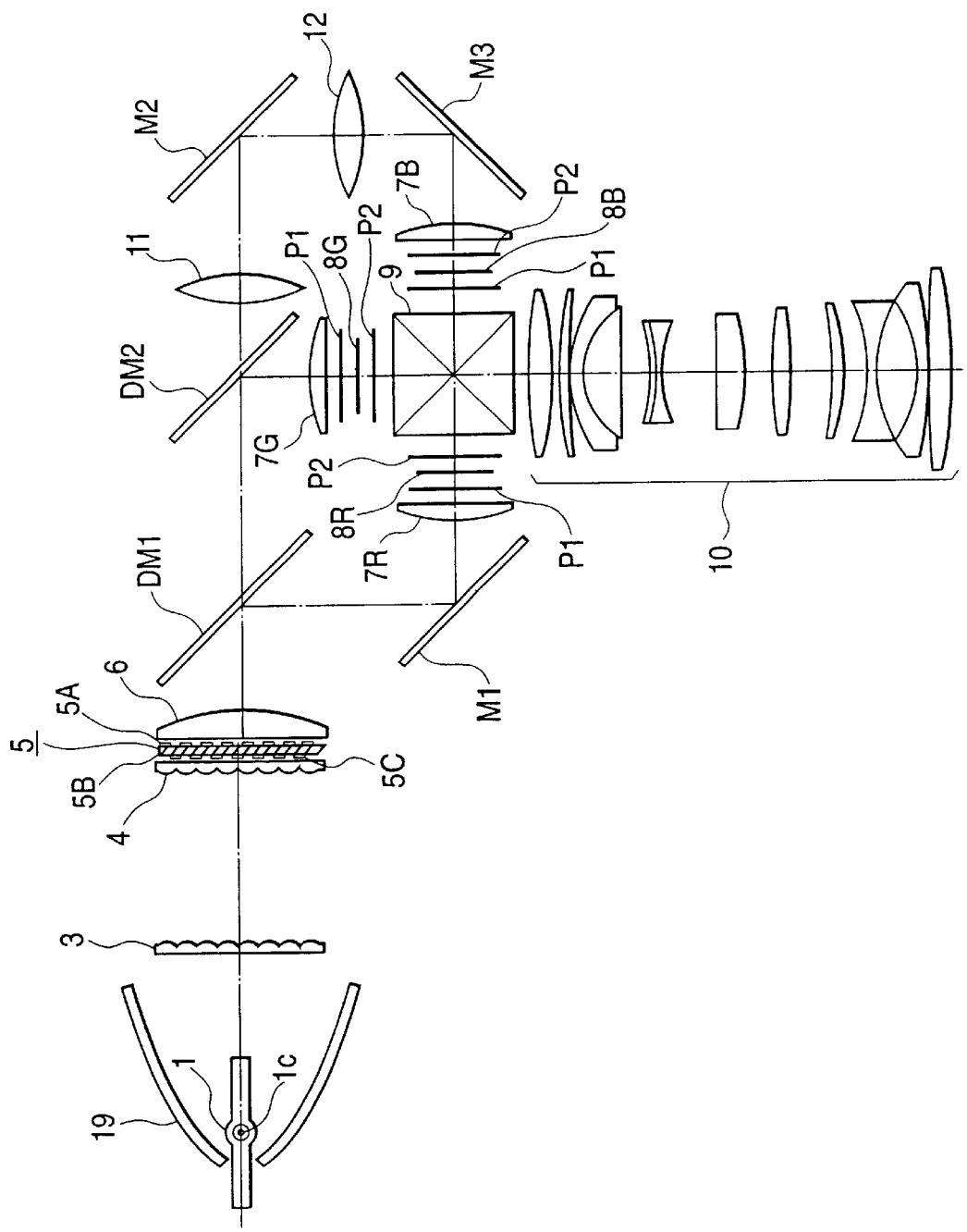
FIG. 10 is an optical, cross-sectional view of a projection type display device of a conventional example.

FIG. 3 shows an example of the reflector 2 used in the conventional example as illustrated in FIG. 10 and is a cross-sectional view of the parabolic reflector having the focal length of 7 mm, the diameter of the hole of the reflector of 10 mm, and the effective diameter of the reflector of 80 mm, which also shows the take-in angle of the light from the first focal point F1P by the reflector. FIG. 3 further shows a difference between actual focal lengths in the central part and in the peripheral part of the reflector. As illustrated in FIG. 3, the actual focal lengths are greatly different between in the center and in the periphery. In this case an actual focal length means a distance of an arbitrary optical path between the focal point and a reflecting point. In the example of FIG. 3, the actual focal length is 8.19 mm at the position a little over 5 mm from the center (the optical axis), whereas the actual focal length is 47.79 mm at the position of 33.79 mm from the optical axis.

It is seen from comparison between FIG. 2 and FIG. 3 that, supposing the reflectors have approximately equal size, the ellipsoidal reflector has the greater light take-in angle of reflector. This is for the following reason; distances from the focal point to the reflecting surface can be greater in the ellipsoidal mirror and, supposing the reflectors have the hole of the same size, the eclipse due to the hole is smaller in the ellipsoidal mirror. An actually measured value of the take-in angle is 102.111° (50.6910°+51.420°) in the case of the paraboloidal reflector, whereas an actually measured value of the take-in angle is 112.062° (61.843°+50.219°) in the case of the ellipsoidal reflector. This verifies that the light take-in angle of the ellipsoidal reflector is about 10% greater than that of the paraboloidal reflector.

Figure 4:
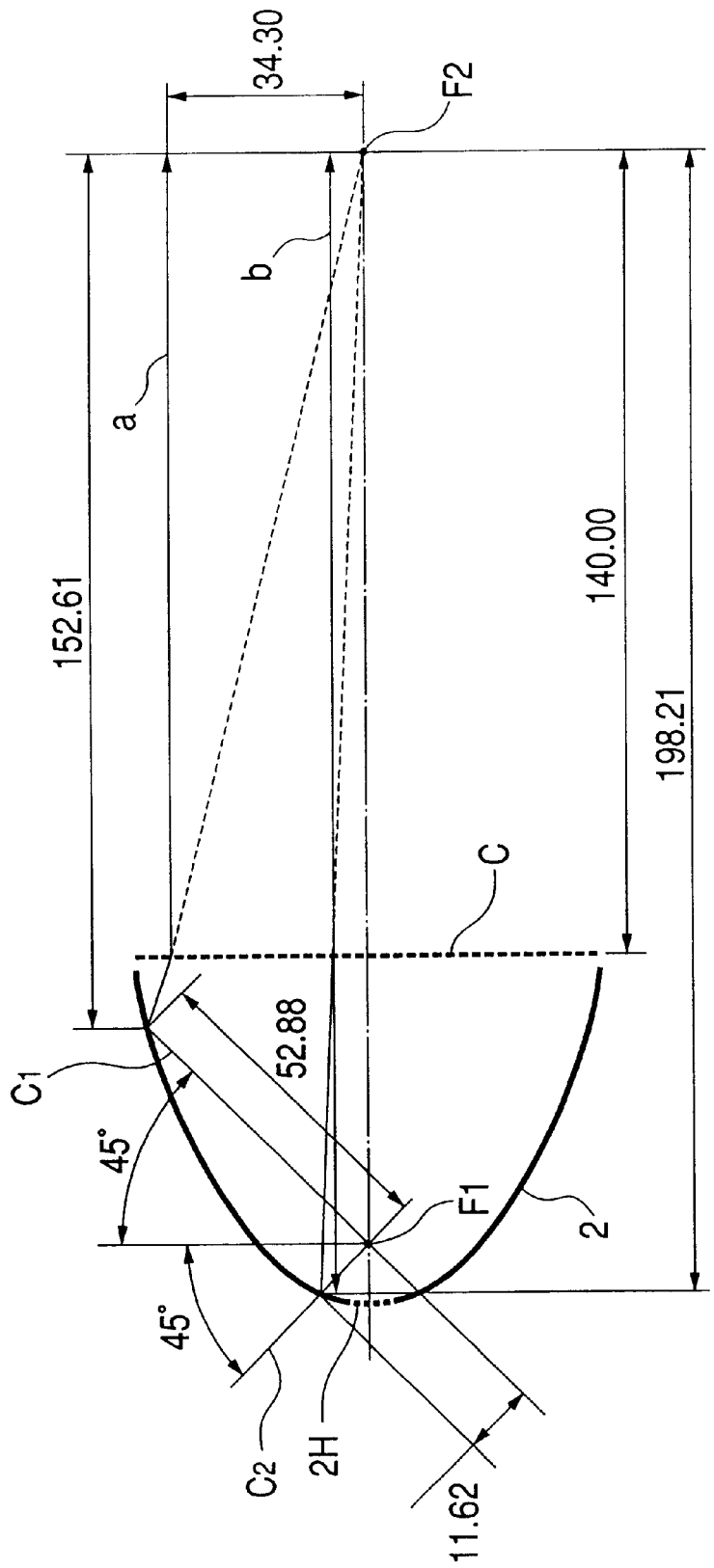
FIG. 4 is a constitutional principle diagram of a combination of an ellipsoidal mirror with a double-concave lens.
Figure 5:
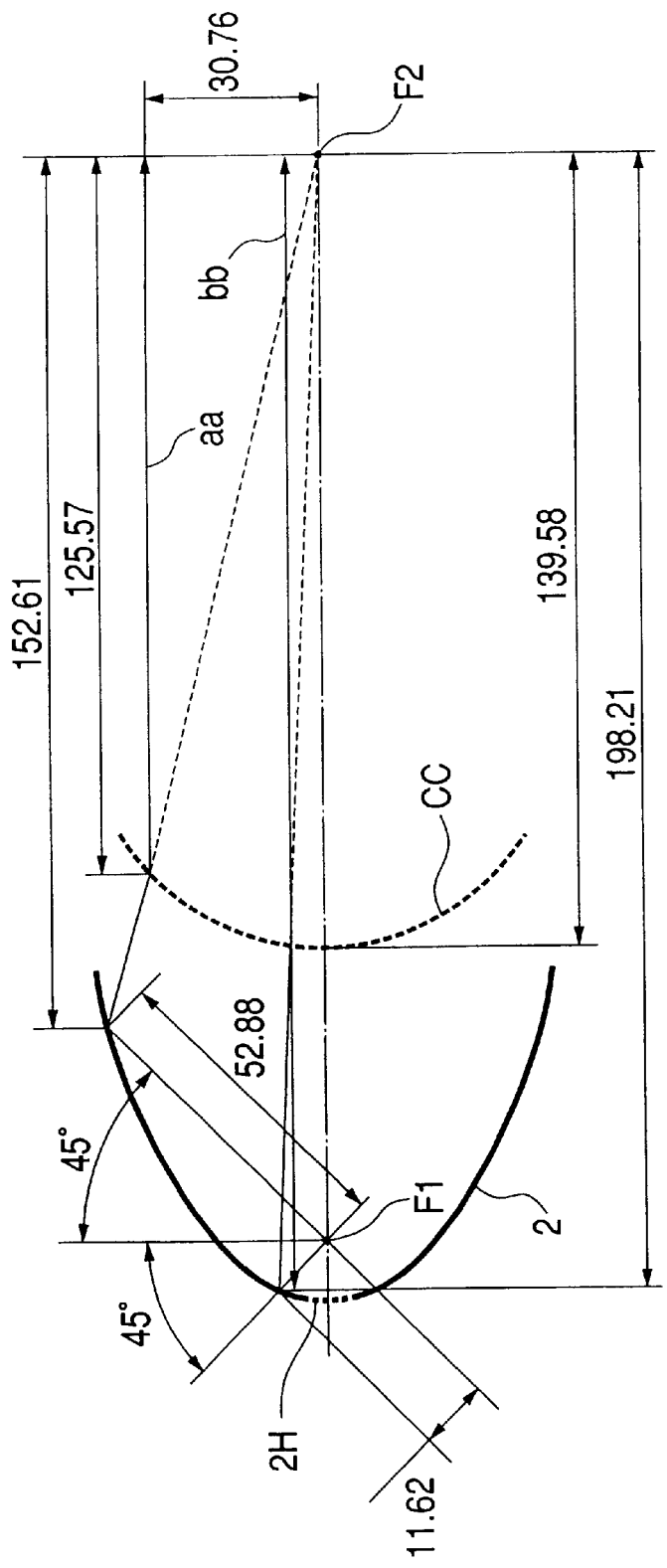
FIG. 5 is a constitutional principle diagram of an ellipsoidal mirror and a negative lens according to the embodiment of the present invention.

FIG. 4 and FIG. 5 are principle explanation diagrams to illustrate why the illumination efficiency is improved by employing the negative meniscus lens convex on the light source side, as the concave lens in the structure of the illuminating apparatus having the combination of the ellipsoidal reflector with the concave lens.

FIG. 4 shows an optical path diagram of an illumination optical system as a combination of the negative lens having the focal length of −140 mm with the same ellipsoidal reflector as the one illustrated in FIG. 2 in which the distance from the first focal point F1 to the intersection between the reflecting surface of ellipsoid and the optical axis is 10 mm, the distance from the second focal point to the intersection between the reflecting surface of ellipsoid and the optical axis is 200 mm, the diameter of the hole of the reflector is 10 mm, and the effective diameter of the reflector is 80 mm. Here a refractively acting surface means a surface obtained by connecting intersecting points between incident rays and emergent rays to or from the negative meniscus lens. For example, in cases wherein the refractively acting surface C is normal to the optical axis as in double-concave lenses, a partial focal length compression rate for a beam (optical path a) passing the peripheral part of the reflector, 140/152.61= 0.917, is greater than that for a beam (optical path b) near the center of the reflector, 140/198.21=0.706, so that the compression of beam by the negative lens becomes weaker toward the periphery. This is because an actually acting point in the periphery of the ellipsoidal mirror moves more toward the second focal point F2 with decrease in the distance to the periphery of the reflector and becomes closely proximate to the refractively acting surface C of the negative lens.

Therefore, in spite of the use of the ellipsoidal mirror and the negative lens, as illustrated in the drawing, a distance of a ray $C_1$ emergent at the angle of 45° toward the first lens array, 34.3 mm, is rather greater than a distance of a ray $C_2$ emergent at the angle of 45° toward the first lens array in the parabolic mirror illustrated in FIG. 3, 33.79 mm. The exit diameter of the light can be decreased by moving the position of the negative lens toward the second focal point F2 and decreasing the focal length of the negative lens. However, this also decreases the combined focal length of the ellipsoidal mirror and the negative lens in the central part to a value smaller than in the case of the parabolic mirror illustrated in FIG. 3. It thus results in degrading the parallelism and in turn increasing the eclipse at the shield plates of the polarization converting element.

In contrast with it, when the negative lens is constructed of the negative meniscus lens convex on the first focal point side (the light source side) as in the embodiment of FIG. 1 so as to curve the refractively acting surface CC of the negative lens toward the second focal point F2 and enhance the partial focal length in the peripheral part, the partial focal length compression rate of a beam (optical path aa) in the periphery of the reflector, 125.57/152.61=0.823, can be made considerably close to that of a beam (optical path bb) near the center of the reflector, 139.58/198.21=0.704, as illustrated in FIG. 5 of the principle diagram of the present embodiment. This permits the beam compression rates to be increased in the peripheral part of the ellipsoidal reflector by the negative lens to higher levels than before. As a result, the diameter of beams emitted from the light source section can be decreased and the illumination efficiency can be improved thereby. The radius of curvature of the refractively acting surface of the negative lens illustrated in FIG. 5 is 40 mm.

In the present embodiment, where the diameter of the beams emitted from the light source section is compressed by the combination of the ellipsoidal reflector with the negative lens, the refractively acting surface of the negative lens is curved toward the second focal point of the ellipsoidal reflector and the partial, actual focal lengths in the peripheral part are made shorter than those in the central part to increase the compression rates of beams emerging from the peripheral part of the ellipsoidal reflector, as compared with those in the conventional example, thereby realizing the decrease of the diameter of the light emitted from the light source section, decreasing the eclipse at the entrance pupil of the projection lens, and thus realizing the improvement in the illumination efficiency.

As illustrated in FIG. 4 and FIG. 5, the actual combined focal lengths fb and fbb of the optical paths b and bb in the central part of the ellipsoidal reflector are 8.207 mm and 8.183 mm, respectively, which are almost equal to each other, and the actual combined focal lengths fa and faa of the optical paths a and aa in the peripheral part of the ellipsoidal reflector are 48.51 mm and 43.51 mm, respectively. Thus the actual combined focal length of the optical path aa is shorter than that of the optical path a. In the present embodiment, therefore, the actual combined focal lengths can be shortened in the peripheral part with little change in the actual combined focal lengths in the central part as described above.

As a consequence, the distance of the ray emergent at the angle of 45° on the first lens array side from the optical axis was able to be compressed from 34.3 mm in FIG. 4 to 30.76 mm in FIG. 5. The diameter of the light arriving at the polarization converting element 5 can be decreased in this way. Therefore, the eclipse of light can be decreased at the pupil of the projection lens.

In the principle diagram of the present embodiment of FIG. 5, as compared with the parabolic mirror of FIG. 3, the light take-in angle is increased by about 10% and the exit diameter of light is decreased by about 10%, whereby the great improvement is realized as a whole in the illumination efficiency.

(Second Embodiment)

Figure 6:
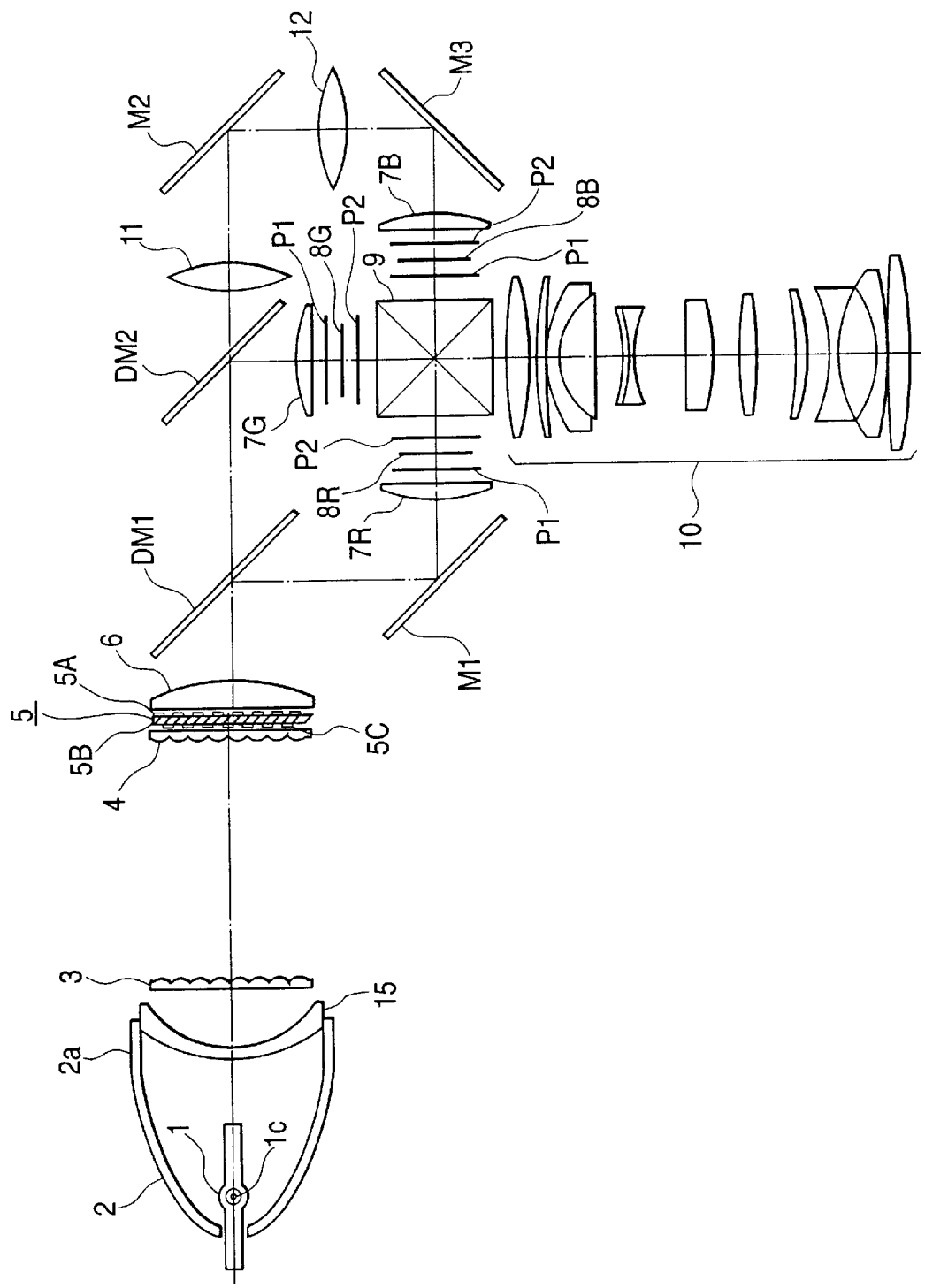
FIG. 6 is an optical, cross-sectional view of a projection type display device according to the second embodiments the present invention.

FIG. 6 is an optical, cross-sectional diagram of a projection type display device according to the second embodiment of the present invention. The ellipsoidal mirror 2 is extended so as to hold the negative lens 15, thereby realizing the decrease in the number of mechanical parts and assuring the safety in the event of explosion of the arc tube. The shape and placement position of the negative lens 15 are different from those in the first embodiment. The radius of curvature of the lens surface of the negative lens on the first lens array 3 side is smaller than that in the first embodiment and an aspherical surface is used therefor, so as to decrease spherical aberration occurring at the lens surface of the negative meniscus lens on the first lens array side, thereby realizing further improvement in the illumination efficiency. It can also be contemplated that the aspherical effect is made on the reflector 2 side by using an aspherical reflector and the negative meniscus lens is comprised of spherical surfaces. It is desirable to provide the surface of the negative lens 15 with a transparency-enhancing coat for preventing the light amount loss or with a coat for cutting the infrared and ultraviolet light, in terms of increasing the light amount and decreasing the number of components.

(Third Embodiment)

Figure 7:
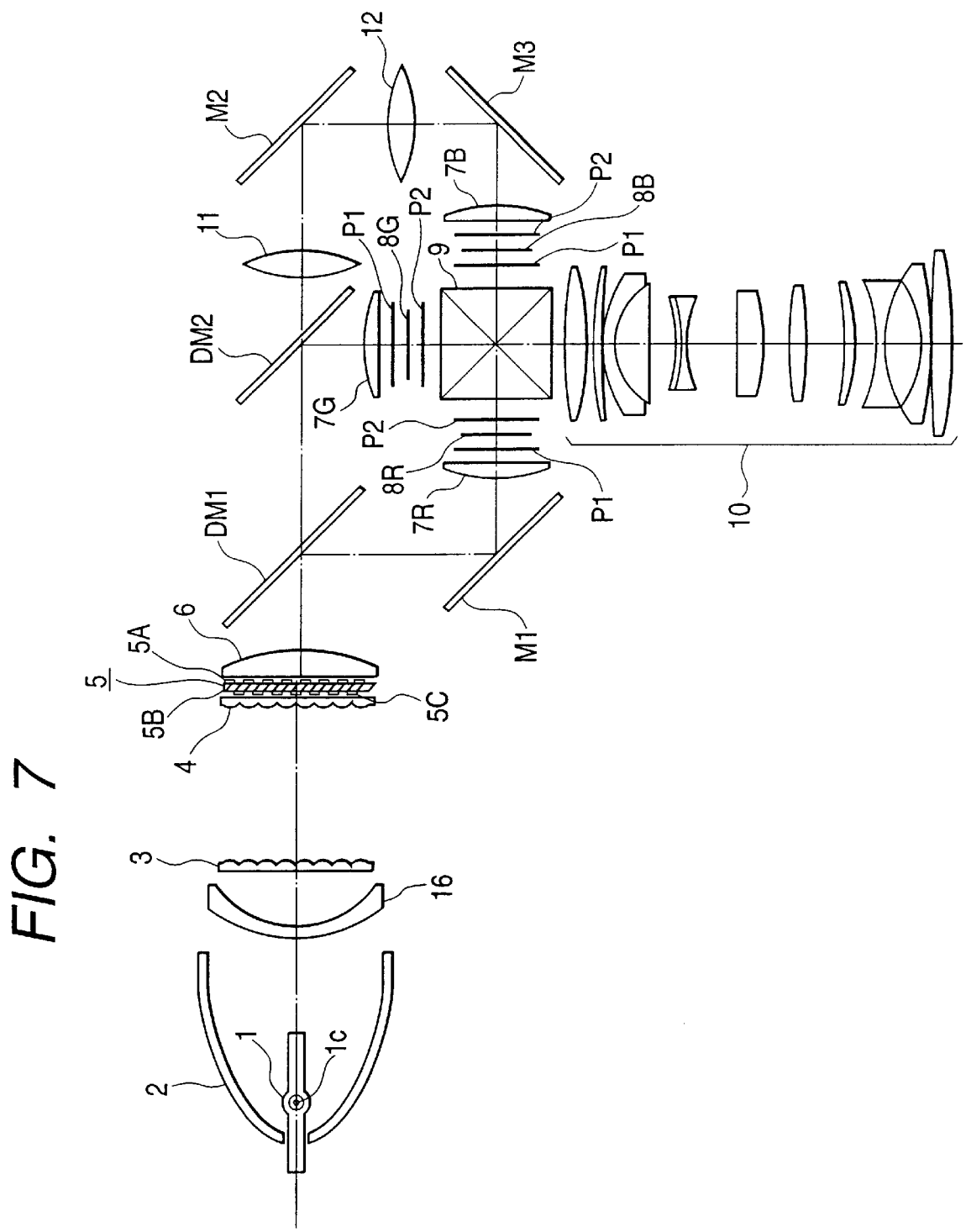
FIG. 7 is an optical, cross-sectional view of a projection type display device according to the third embodiment of the present invention.

FIG. 7 is an optical, cross-sectional view of a projection type display device according to the third embodiment of the present invention. The radius of curvature of the lens surface of the negative lens 16 on the image modulating device side is further smaller than in the second embodiment, thereby realizing further improvement in the illumination efficiency.

The aspherical surface is also used for the lens surface of the negative lens 16 on the first lens array side.

(Fourth Embodiment)

Figure 8:
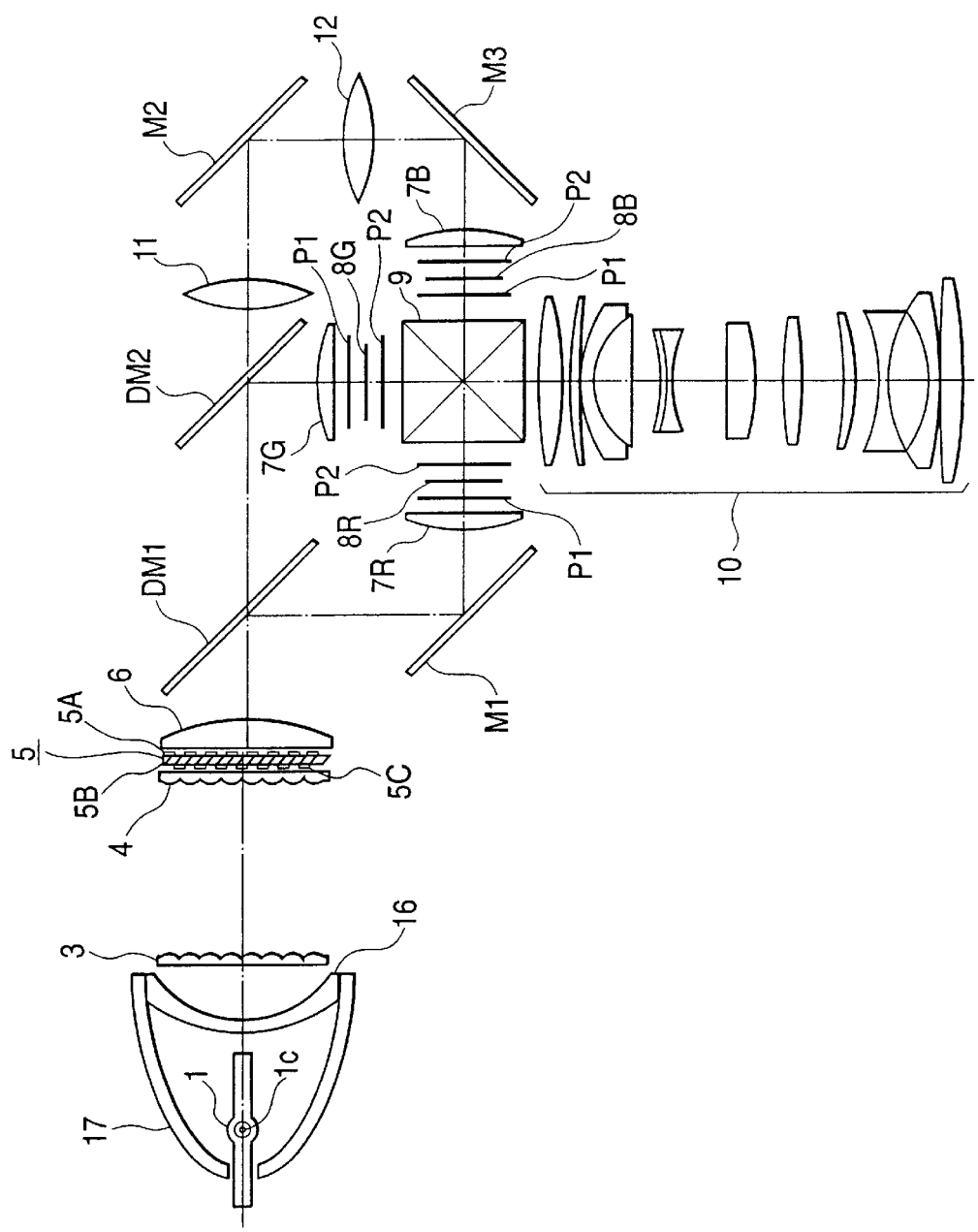
FIG. 8 is an optical, cross-sectional view of a projection type display device according to the fourth embodiment of the present invention.

FIG. 8 is an optical, cross-sectional view of a projection type display device according to the fourth embodiment of the present invention. The second focal length of the ellipsoidal reflector 17 is shorter than that in Embodiments 1, 2, and 3, thereby realizing the size reduction. The negative lens 16 also functions as a protecting glass for assuring the safety in the event of explosion of the arc tube. The aspherical surface is also used for the lens surface of the negative lens 16 on the first lens array side.

(Fifth Embodiment)

Figure 9:
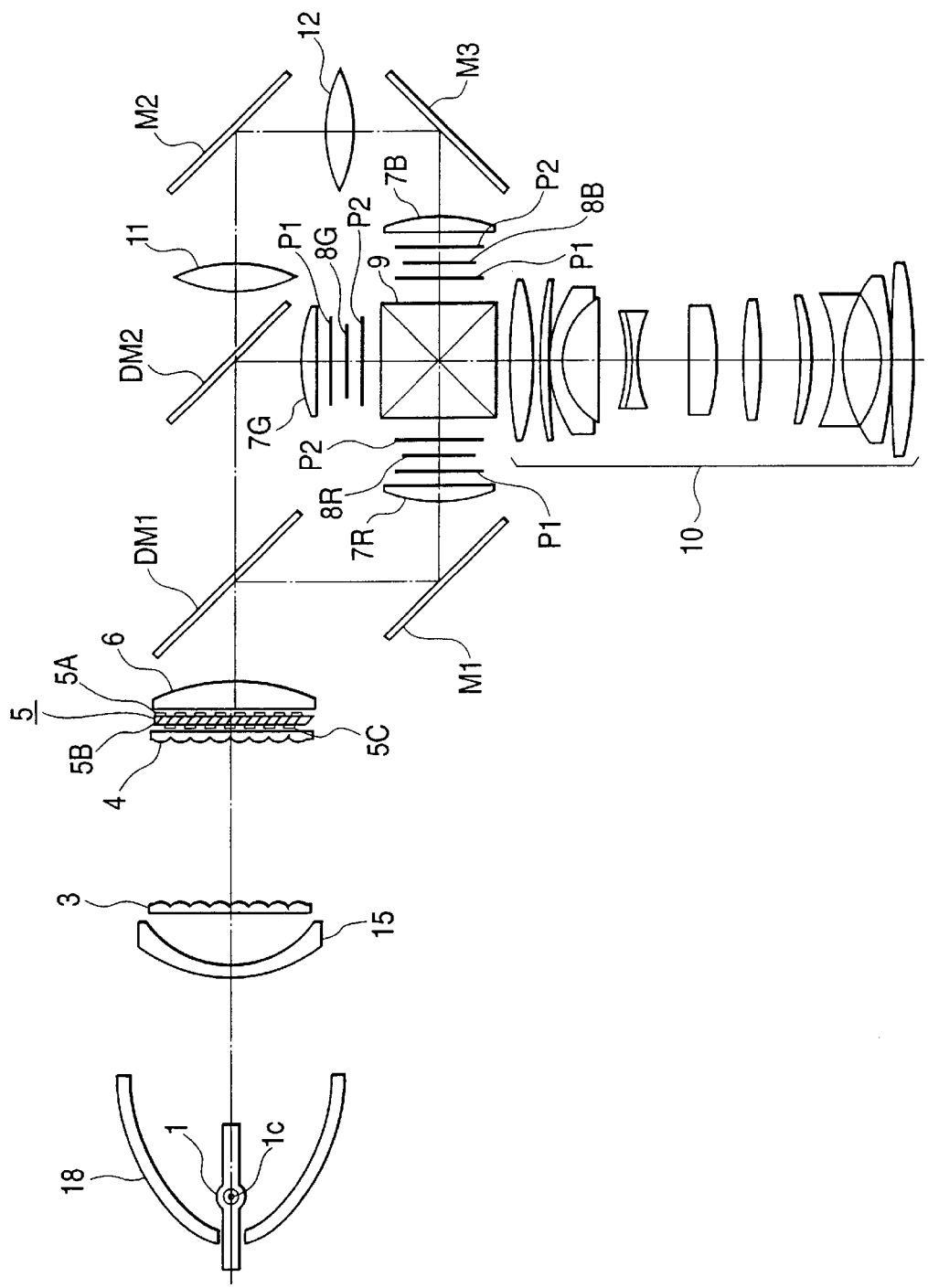
FIG. 9 is an optical, cross-sectional view of a projection type display device according to the fifth embodiment of the present invention.

FIG. 9 is an optical, cross-sectional view of a projection type display device according to the fifth embodiment of the present invention. The second focal length of the ellipsoidal reflector 18 is longer than that in Embodiments 1, 2, and 3, thereby decreasing the exit diameter of light from the light source section and realizing further improvement in the efficiency. The present embodiment is suitable for cases wherein the size of the light-emitting portion is particularly small.

(Numerical Examples)

Numerical examples of the light source section will be described below.

R1: radius of curvature of the light-source-side lens surface of the negative lens R2: radius of curvature of the image-modulating-device-side lens surface of the negative lens D: center thickness of the negative lens N: index of refraction of the negative lens at the d-line K: conical constant Numerical Example 1 (corresponding to the light source section of FIG. 1)

Ellipsoidal mirror F1: 10 mm, F2: 200 mm

Concave lens R1: 133.156 mm, R2: 47.427 mm, D: 4 mm, N: 1.51633

Distance between the vertex of the reflecting surface of the ellipsoidal mirror and the concave lens R1: 72 mm (including the plate glass 14 having the thickness of 4 mm, the refractive index of the plate glass being 1.51633)

Numerical Example 2 (corresponding to the light source section of FIG. 6)

Ellipsoidal mirror F1: 10 mm, F2: 200 mm

Concave lens R1: 95.2 mm, R2: 40 mm, D: 2 mm, K: aspherical coefficient of R2 (K=−0.5), N: 1.51633

Distance between the vertex of the reflecting surface of the ellipsoidal mirror and the concave lens R1: 72 mm Numerical Example 3 (corresponding to the light source section of FIG. 7)

Ellipsoidal mirror F1: 10 mm, F2: 200 mm

Concave lens R1: 71 mm, R2: 35 mm, D: 2 mm, K: aspherical coefficient of R2 (K=−0.5), N: 1.51633

Distance between the vertex of the reflecting surface of the ellipsoidal mirror and the concave lens R1: 72 mm Numerical Example 4 (corresponding to the light source section of FIG. 8)

Ellipsoidal mirror F1: 10 mm, F2: 180 mm

Concave lens R1: 71 mm, R2: 35 mm, D: 2 mm, K: aspherical coefficient of R2 (K=−0.5), N: 1.51633

Distance between the vertex of the reflecting surface of the ellipsoidal mirror and the concave lens R1: 52 mm Numerical Example 5 (corresponding to the light source section of FIG. 6)

Ellipsoidal mirror F1: 10 mm, F2: 230 mm

Concave lens R1: 95.2 mm, R2: 40 mm, D: 2 mm, K: aspherical coefficient of R2 (K=−0.5), N: 1.51633

Distance between the vertex of the reflecting surface of the ellipsoidal mirror and the concave lens R1: 100 mm Values of the respective conditions are as follows.

TABLE 1

|  | Ex 1 | Ex 2 | Ex 3 | Ex 4 | Ex 5 |
| --- | --- | --- | --- | --- | --- |
| Condition (1) | 0.05 | 0.05 | 0.05 | 0.0556 | 0.0435 |
| Condition (2) | 0.725 | 0.676 | 0.681 | 0.757 | 0.588 |
| Condition (3) | 0.62 | 0.63 | 0.63 | 0.7 | 0.557 |
| Condition (4) | −2.106 | −2.449 | −2.944 | −2.944 | −2.449 |

Figure 11:
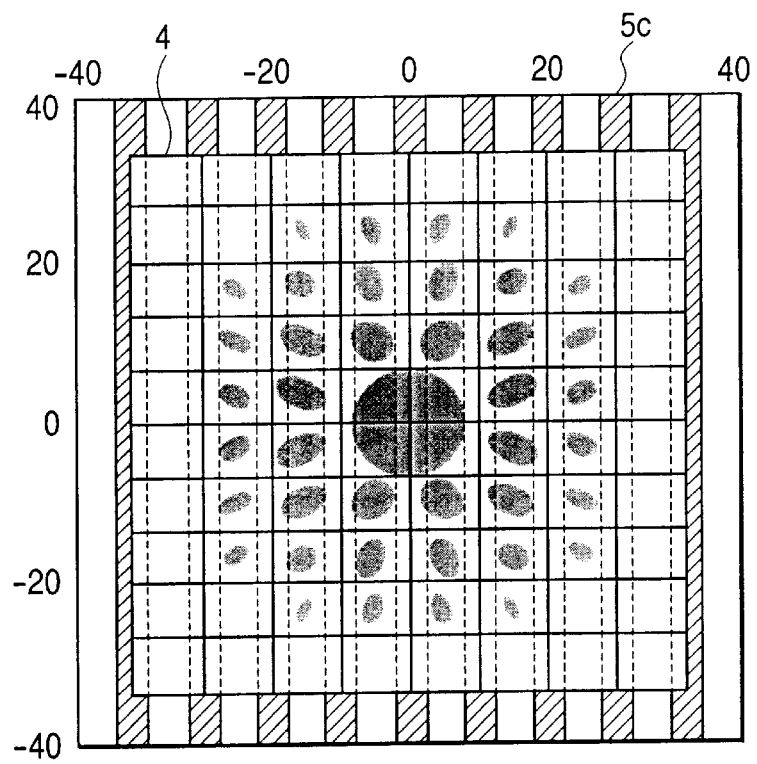
FIG. 11 is a spot diagram on a second lens array surface of the device of FIG. 6.
Figure 12:
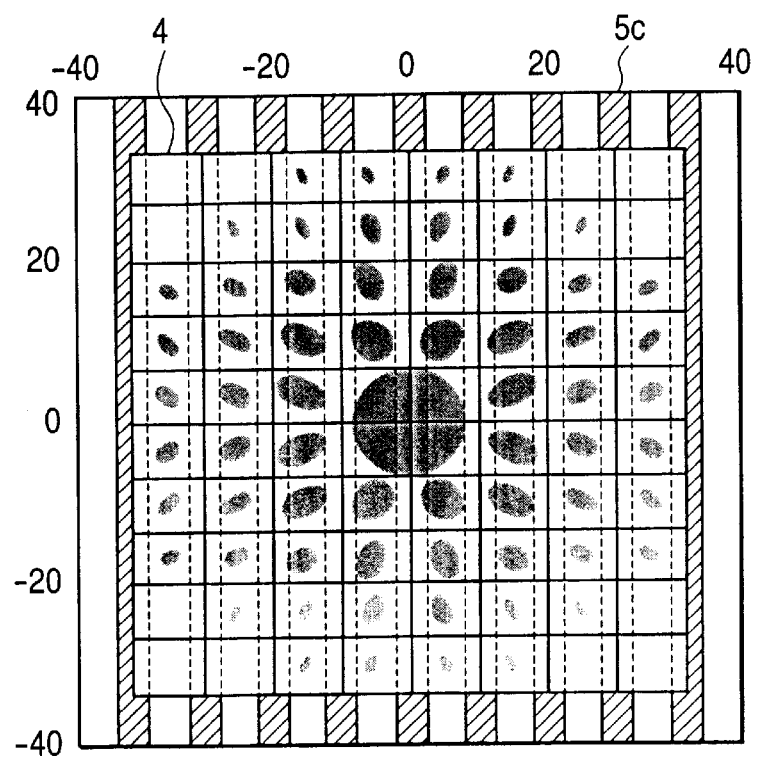
FIG. 12 is a spot diagram on the second lens array surface of the conventional example.

FIG. 11 shows a spot diagram on the second lens array surface in Numerical Example 2 of the present invention. For comparison's sake, FIG. 12 shows a spot diagram on the second lens array surface where the parabolic mirror shown in FIG. 3 (conventional example) is incorporated in the liquid-crystal projector (of the conventional example) of FIG. 10. In the figures, numeral 4 designates the second lens array and 5C the shield plates of the polarization converting element. It is seen from FIG. 12 that, because the actual focal lengths of the parabolic mirror become longer toward the peripheral part, the sizes of the light source images by the first lens array become smaller toward the peripheral part with respect to the size of each lens of the lens array, so as to increase a margin, and in the peripheral part there occurs no eclipse due to the polarization converting element even if the parallelism of the beams from the first lens array becomes a little worse.

It is also understood from the comparison of FIG. 11 with FIG. 12 that in the present invention only the actual combined focal lengths in the peripheral part can be shortened without decrease in the actual combined focal lengths in the central part of the optical system of the light source section and thus the diameter of the beams emerging from the light source section can be decreased without degradation of the parallelism in the central part.

It is apparent from FIG. 11 that in the peripheral part there is few light source image formed on the shield plates 5C in spite of the decrease of the beam diameter and thus the illumination efficiency is good.

As described above, the illuminating apparatus of the present invention can implement the improvement in the illumination efficiency. Since the diameter of the beams emerging from the light source section can be made smaller, the lens arrays, the polarization converting element, and the dichroic mirrors can be constructed in smaller dimensions.

What is claimed is:

1. An illuminating apparatus for guiding light from a light source to effect illumination comprising:

a reflector for reflecting the light from said light source;

a negative meniscus lens which is convex on the light source side;

a first lens array unit comprising a plurality of lens elements; and a second lens array unit comprising a plurality of lens elements, said reflector, negative meniscus lens, first lens array unit, and second lens array unit being arranged in the stated order along a traveling direction of the light from the light source, wherein said reflector has a shape of ellipsoid of revolution, and wherein the following condition is satisfied:

$$0.50 < -f\!f/f2 < 0.80,$$

where ff is a focal length of said meniscus lens and f2 is a second focal length of said reflector.

2. The apparatus according to claim 1, wherein said light source and said second lens array unit are conjugate with each other.

3. A projector comprising the apparatus as set forth in claim 1.

4. The apparatus according to claim 1, wherein the following condition is satisfied:

$$0.03 < f1/f2 < 0.07,$$

where f1 and f2 are a first focal length and a second focal length of said reflector, respectively.

5. An illuminating apparatus for guiding light from a light source to effect illumination, comprising:
 a reflector for reflecting the light from said light source;
 a negative meniscus lens which is convex on the light source side;
 a first lens array unit comprising a plurality of lens elements; and
 a second lens array unit comprising a plurality of lens elements,
 said reflector, negative meniscus lens, first lens array unit, and second lens array unit being arranged in the stated order along a traveling direction of the light from the light source, wherein said reflector has a shape of ellipsoid of revolution, and wherein the following condition is satisfied:

$$0.5 < L/f2 < 0.8,$$

where L is a distance between said meniscus lens and a second focal point of said reflector and f2 is a second focal length of said reflector.

6. The apparatus according to claim 5, wherein said light source and said second lens array unit are conjugate with each other.

7. A projector comprising the apparatus as set forth in claim 5.

8. The apparatus according to claim 5, wherein the following condition is satisfied:

$$0.03 < f1/f2 < 0.07,$$

where f1 and f2 are a first focal length and a second focal length of said reflector, respectively.

9. An illuminating apparatus for guiding light from a light source to effect illumination, comprising:
 a reflector for reflecting the light from said light source;
 a negative meniscus lens which is convex on the light source side;
 a first lens array unit comprising a plurality of lens elements; and
 a second lens array unit comprising a plurality of lens elements,
 said reflector, negative meniscus lens, first lens array unit, and second lens array unit being arranged in the stated order along a traveling direction of the light from the light source, and wherein the following condition is satisfied:

$$-4 < SF < -1.5,$$

provided that $SF = (R2+R1)/(R2-R1)$
where R1 is a radius of curvature of said meniscus lens on the light source side and R2 a radius of curvature of said meniscus lens on the first lens array unit side.

10. The apparatus according to claim 9, wherein said light source and said second lens array unit are conjugate with each other.

11. A projector comprising the apparatus as set forth in claim 9.

12. The apparatus according to claim 9, wherein the following condition is satisfied:

$$0.03 < f1/f2 < 0.07,$$

where f1 and f2 are a first focal length and a second focal length of said reflector, respectively.

13. An illuminating apparatus for guiding light from a light source to effect illumination, comprising:
 a reflector having a shape of ellipsoid of revolution for reflecting the light from said light source;
 a negative meniscus lens which is convex toward the light source side;
 a first lens array unit comprising a plurality of lens elements; and
 a second lens array unit comprising a plurality of lens elements,
 wherein a distance between said first lens array unit and said second lens array unit is longer than a distance between said negative meniscus lens and said first lens array unit.

14. The apparatus according to claim 13, wherein said negative meniscus lens includes at least one aspherical surface.

15. The apparatus according to claim 13, wherein the reflection surface of said reflector is an aspherical surface.

16. The apparatus according to claim 13, wherein the following condition is satisfied:

$$0.03 < f1/f2 < 0.07,$$

where f1 and f2 are a first focal length and a second focal length of said reflector, respectively.

17. A projector comprising the apparatus as set forth in claim 13.

18. An illuminating apparatus for guiding light from a light source to effect illumination, comprising:
 a reflector having a shape of ellipsoid of revolution for reflecting the light from said light source; and
 a negative meniscus lens which is convex toward the light source side,
 wherein the following condition is satisfied:

$$0.5 < -ff/f2 < 0.8,$$

where ff is a focal length of said meniscus lens and f2 is a second focal length of said reflector.

19. The apparatus according to claim 18, wherein said negative meniscus lens includes at least one aspherical surface.

20. The apparatus according to claim 18, wherein the reflection surface of said reflector is an aspherical surface.

21. The apparatus according to claim 18, wherein the following condition is satisfied:

$$0.03 < f1/f2 < 0.07,$$

where f1 and f2 are a first focal length and a second focal length of said reflector, respectively.

22. A projector comprising the apparatus as set forth in claim 18.

23. An illuminating apparatus for guiding light from a light source to effect illumination, comprising:
a reflector having a shape of ellipsoid of revolution for reflecting the light from said light source; and
a negative meniscus lens which is convex toward the light source side,
wherein the following condition is satisfied:

$$0.5 < L/f2 < 0.8,$$

where L is a distance between said meniscus lens and a second focal point of said reflector and f2 is a second focal length of said reflector.

24. The apparatus according to claim 23, wherein said negative meniscus lens includes at least one aspherical surface.

25. The apparatus according to claim 27, wherein the reflection surface of said reflector is an aspherical surface.

26. The apparatus according to claim 23, wherein the following condition is satisfied:

$$0.03 < f1/f2 < 0.07,$$

where f1 and f2 are a first focal length and a second focal length of said reflector, respectively.

27. A projector comprising the apparatus as set forth in claim 23.

28. An illuminating apparatus for guiding light from a light source to effect illumination, comprising:
a reflector having a shape of ellipsoid of revolution for reflecting the light from said light source; and
a negative meniscus lens which is convex toward the light source side,
wherein the following condition is satisfied:

$$-4 < SF < -1.5,$$

provided that $SF = (R2+R1)/(R2-R1)$
where R1 is a radius of curvature of said meniscus lens on the light incidence side which is the light source side, and R2 is a radius of curvature of said meniscus lens on the light exit side.

29. The apparatus according to claim 28, wherein said negative meniscus lens includes at least one aspherical surface.

30. The apparatus according to claim 28, wherein the reflection surface of said reflector is an aspherical surface.

31. The apparatus according to claim 28, wherein the following condition is satisfied:

$$0.03 < f1/f2 < 0.07,$$

where f1 and f2 are a first focal length and a second focal length of said reflector, respectively.

32. A projector comprising the apparatus as set forth in claim 28.

33. An illuminating apparatus comprising:
a first optical system for converting light from a light source into a converged light;
a second optical system having a negative refractive power by which the converged light is converted into a parallel light, said second optical system having a negative meniscus lens which is convex on the first optical system side;
a first array-shaped optical system which divides the parallel light into a plurality of light beams; and
a third optical system for causing said plurality of light beams to be overlapped on a surface to be illuminated.

34. The apparatus according to claim 33 further comprising a second array-shaped optical system disposed near a position where an image or the light source is formed.

35. The apparatus according to claim 34, wherein said second array-shaped optical system is disposed between said second optical system and said first array-shaped optical system.

36. The apparatus according to claim 33, further comprising a polarization converting element which converts the light from said from said first optical system into a substantially linearly polarized light.

37. The apparatus according to claim 36, wherein said polarization converting element has light shielding plates arranged in a reed screen pattern.

38. The apparatus according to claim 37, wherein said first array-shaped optical system forms a plurality of light source images between the light shielding plates arranged in reed screen pattern.

39. The apparatus according to claim 33, wherein said first optical system has an ellipsoidal mirror of revolution.

40. The apparatus according to claim 33, wherein said first optical system comprises a reflector for reflecting light from the light source and an optical element supported on a peripheral portion of the reflector.

41. The apparatus according to claim 40, wherein said reflector is an ellipsoidal mirror of revolution, and said optical element is said meniscus lens.

42. A projection type display apparatus comprising:
an illuminating apparatus according to claim 33;
an image modulation device which is illuminated by said illuminating apparatus; and
a projection lens for projecting a light beam from said image modulation device onto a surface to be projected.

43. An illuminating apparatus comprising:
a first optical system for converting light from a light source into a converged light;
a second optical system having a negative refractive power by which the converged light is converted into a parallel light, said optical system having a negative meniscus lens which is convex on the first optical system side; and
a polarization converting element for converting the light from said second optical system into a substantially linearly polarized light, said polarization converting element having light shielding plates at the light incident side for blocking a part of the light from said second optical system.

44. The apparatus according to claim 43 further comprising a first lens array unit which divides the parallel light to be converted into a plurality of light beams, wherein said light shielding plates are arranged in a reed screen pattern, and said first lens array unit forms a plurality of light source images on gaps between said light shielding plates.

45. The apparatus according to claim 44 further comprising a second lens array unit which is disposed near a position where the light source images are formed.

46. The apparatus according to claim 43, wherein said first optical system has an ellipsoidal mirror of revolution.

47. The apparatus according to claim 43, wherein said first optical system comprises a reflector for reflecting the light from the light source and an optical element supported on a peripheral portion of the reflector.

48. The apparatus according to claim 47, wherein said reflector is an ellipsoidal mirror of revolution, and said optical element is said meniscus lens.

49. A projection type display apparatus comprising:

an illuminating apparatus according to claim 43;

an image modulation device which is illuminated by said illuminating apparatus; and a projection lens for projecting a light beam from said image modulation device onto a surface to be projected.

50. An illuminating apparatus for illuminating a surface to be illuminated with light from a light source, said apparatus comprising:

a reflector having a shape of ellipsoid of revolution for converting the light from the light source into a converged light;

a lens having a negative refractive power which the light from said reflector is converted into a substantially parallel light, wherein said lens is a meniscus lens which is convex on the light source side;

a first lens array unit on which the light is incident from said lens to form a plurality of light source images;

a second lens array unit which is disposed near a position where said plurality of light source images are formed; and a polarization converting element disposed near said second lens array unit, said polarization converting element converting the light from said second lens array unit into a substantially linearly polarized light and having light shielding plates arranged in a reed screen pattern and disposed between said plurality of light source images, said light shielding plates blocking a part of the light from said second lens array unit, wherein said plurality of light source images are formed on gaps between said light shielding plates.

51. The apparatus according to claim 50, wherein said meniscus lens is supported on a peripheral portion of said reflector.

52. A projection type display apparatus comprising:

an illuminating apparatus according to claim 50:

an image modulation device which is illuminated by said illuminating apparatus; and a projection lens for projecting a light beam from said image modulation device onto a surface to be projected.

* * * * *

UNITED STATES PATENT AND TRADEMARK OFFICE
CERTIFICATE OF CORRECTION

PATENT NO.     : 6,464,362 B1
DATED          : October 15, 2002
INVENTOR(S)    : Saburo Sugawara et al.

It is certified that error appears in the above-identified patent and that said Letters Patent is hereby corrected as shown below:

<u>Title page,</u>
Item [*], Notice, the following was omitted:
-- This patent issued on a continued prosecution application filed under
37 CFR 1.53(d), and is subject to the twenty year patent term provisions of
35 U.S.C. 154(a)(2). --

<u>Column 6,</u>
Line 60, "(50.6910°" should read -- (50.691° --

<u>Column 13,</u>
Line 18, should recite dependency from Claim 23.

<u>Column 14,</u>
Line 12, delete "from said", second occurrence.
Line 41, "said optical system" should read -- said second optical system --

<u>Column 15,</u>
Line 15, "power which" should read -- power by which --

Signed and Sealed this

Third Day of June, 2003

JAMES E. ROGAN
*Director of the United States Patent and Trademark Office*